Oct. 11, 1960    H. O. SCHJOLIN ET AL    2,955,678
VEHICLE DISC BRAKE
Filed Nov. 28, 1958      4 Sheets-Sheet 2

INVENTORS
Hans O. Schjolin
Donald K. Isbell
BY
THEIR ATTORNEY

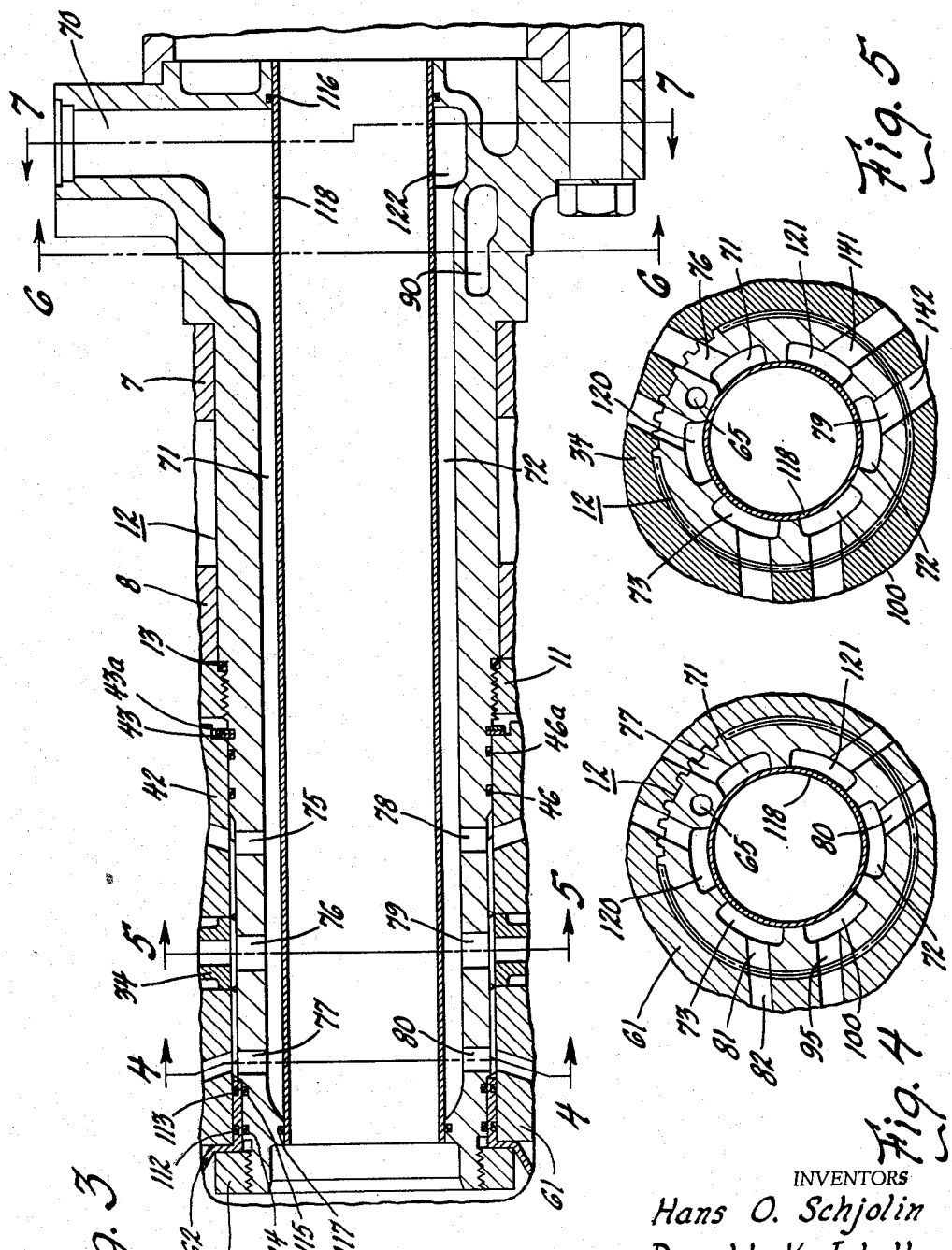

Oct. 11, 1960 H. O. SCHJOLIN ET AL 2,955,678
VEHICLE DISC BRAKE
Filed Nov. 28, 1958 4 Sheets-Sheet 4
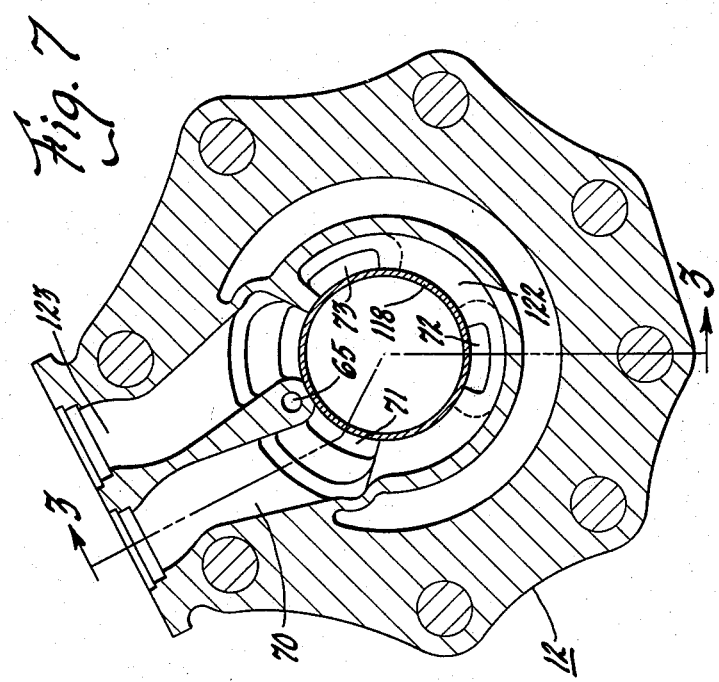
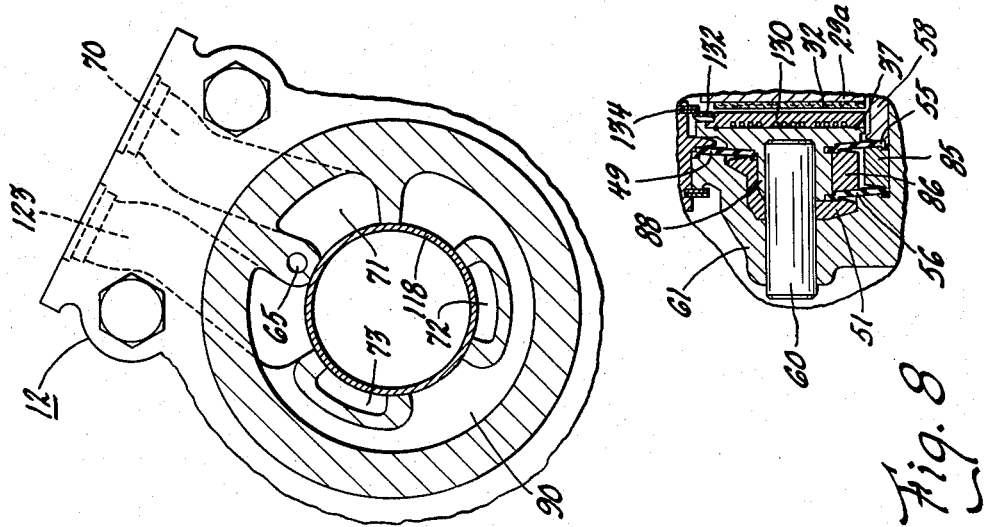
INVENTORS
Hans O. Schjolin
Donald K. Isbell
BY D. C. Staley
THEIR ATTORNEY United States Patent Office 2,955,678
Patented Oct. 11, 1960

2,955,678

VEHICLE DISC BRAKE

Hans O. Schjolin, Birmingham, and Donald K. Isbell, Pontiac, Mich., assignors to General Motors Corporation, Detroit, Mich., a corporation of Delaware Filed Nov. 28, 1958, Ser. No. 777,052

8 Claims. (Cl. 188—18)

This invention relates to a vehicle disc brake or more particularly to a fluid cooled and fluid actuated vehicle disc brake.

Vehicle disc brakes require a means for compressing of the friction discs to accomplish a retarding force on the rotating discs engaging the stationary discs of the vehicle brake. This is usually accomplished by means of a hydraulic wheel piston actuated by a pressurized fluid. A piston operating within a hydraulic cylinder creates a sealing friction on the inner periphery of the hydraulic cylinder. This invention provides a fluid seal with a fluid actuating means wherein the sealing friction is eliminated.

Where the cooling fluid of a vehicle disc brake is circulated over the friction surfaces of the brake discs the fluid acts as a lubricant and lowers the coefficient of friction between the rotating and stationary discs. A brake means wherein the brake surfaces could be kept dry and still provide circulation of the cooling fluid adjacent to the fluid disc provides greater braking efficiency.

These purposes have been accomplished in this invention by means of a fluid wheel piston operating in combination with a fluid wheel cylinder. The sealing means between these two members is provided by a diaphragm which suspends the fluid actuating piston relative to the fluid actuating cylinder. Diaphragms are also employed as a fluid seal for the cooling fluid for the vehicle disc brake.

It is an object of this invention to provide vehicle disc brake which is fluid actuated and fluid cooled.

It is another object of this invention to maintain a dry surface between the frictionally engaged brake discs of the vehicle disc brake and fluid cooling means for cooling of the brake discs.

It is a further object of this invention to provide a vehicle disc brake which employs diaphragm sealing means in the fluid cooling passage means, and the fluid actuating chamber and passage means.

It is a further object of this invention to provide passage means from an external fluid cooling and actuating circuit into the shaft housing means of the vehicle drive shaft to the vehicle disc brake.

The objects of this invention are accomplished by means of providing passage means within the shaft housing which are connected to the external portion of the fluid actuating and fluid cooling circuits. The passages leading to the inner periphery of the vehicle disc brake will provide for circulation of a cooling fluid through chambers which are adjacent to friction discs of the vehicle brake.

Passage means are also provided for the fluid actuating means and are in communication with the actuating chambers within the fluid wheel cylinders for actuating of the fluid pistons for frictionally engaging the brake discs. The fluid pistons are sealed by means of diaphragms to form fluid actuating chambers in the fluid cylinders to provide a positive and flexible seal as the chamber volume increases or decreases during operation.

The hydraulic pistons have a plurality of guides to maintain a relative non-rotating position of the fluid pistons to the fluid cylinders.

The whole braking structure is enclosed within the hub section of the wheel and a housing means adjoins the hub section and extends to the outboard side of the braking structure. The braking structure is mounted within the outboard wheel of a dual wheel structure. This location provides for ease in dismantling of the braking structure from the outboard side of the wheel.

Further objects and advantages of the present invention will be apparent from the following description, reference being had to the accompanying drawings wherein preferred embodiments of the present invention are clearly shown.

In the drawings:

Figure 1 is a cross section view of the vehicle disc brake viewed from a line normal to the axis of the drive shaft.

Figure 2 is a side elevation view of the vehicle disc brake with various portions of the braking structure broken away to clarify the location of the various parts. The portions which are broken away are on several planes. Their location will be more specifically pointed out in the subsequent description.

Figure 3 is a cross section view of the shaft housing which shows the conduit means extended through shaft housing to the inner periphery of the braking structure. Various parts are shown which are adjacent to or mounted on the shaft housing to show the fluid conduits within this portion of the brake.

Figure 4 is a cross section view taken on line 4—4 of Figure 3.

Figure 5 is a cross section view normal to the center line of the drive shaft or taken on line 5—5 of Figure 3.

Figure 6 is a cross section view taken on line 6—6 of of Figure 3 showing the inlet and outlet passages in the shaft housing.

Figure 7 is a cross section view taken on line 7—7 of Figure 3 showing the inlet and outlet passages in the shaft housing.

Figure 8 is a cross section view taken on line 8—8 of Figure 2. This view shows the alignment pin for aligning the fluid piston relative to the fluid cylinder.

The fluid disc brake illustrated in this application is intended to operate with an external fluid system for actuating the vehicle brakes and an external fluid system for cooling of the vehicle brakes. The fluid actuating system is intended to be of any conventional air operated means for actuating a disc brake. The fluid cooling and actuating systems are disclosed in a copending application of the same assignee filed on November 28, 1958, Serial No. 776,896.

Figure 1:
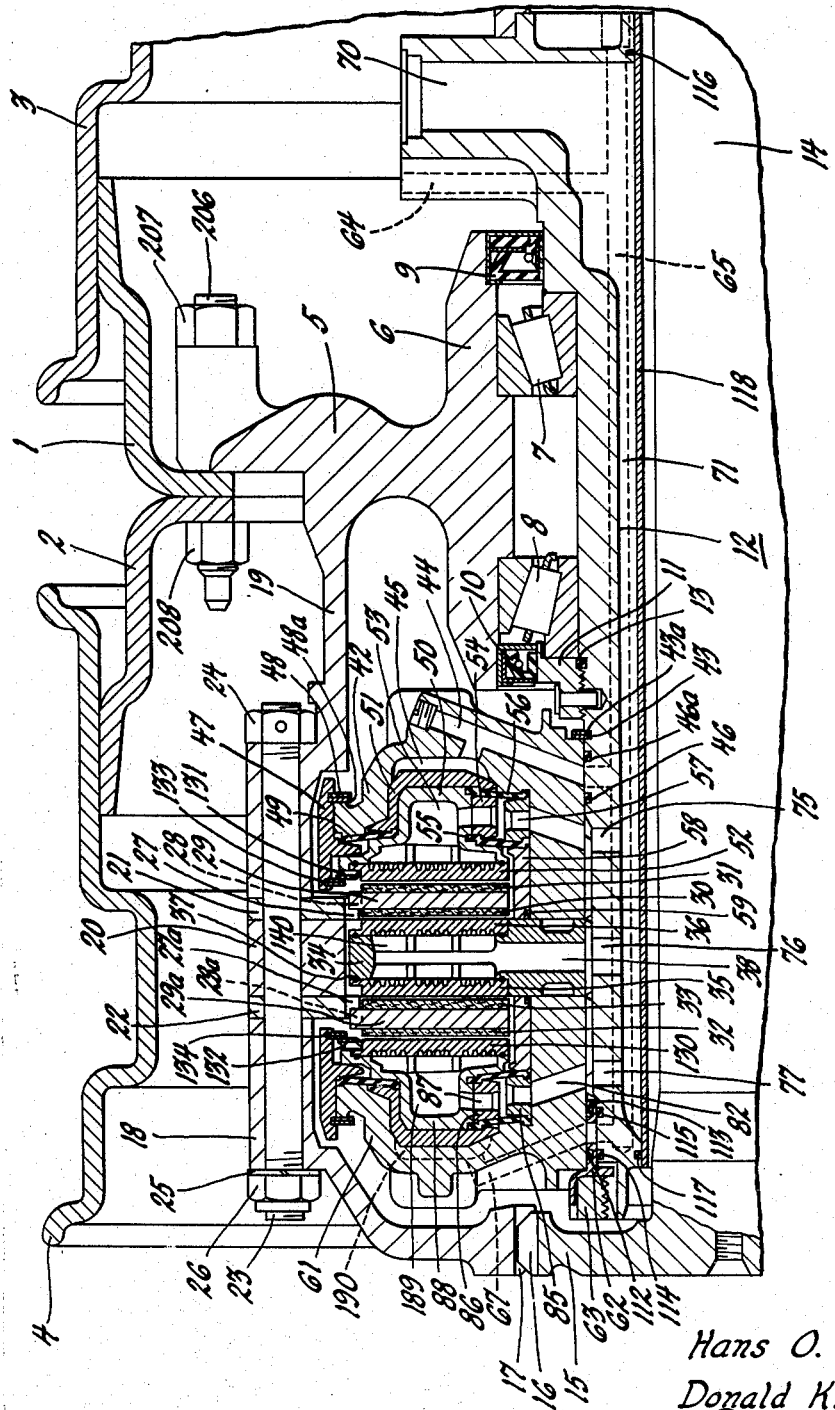
Figure 2:
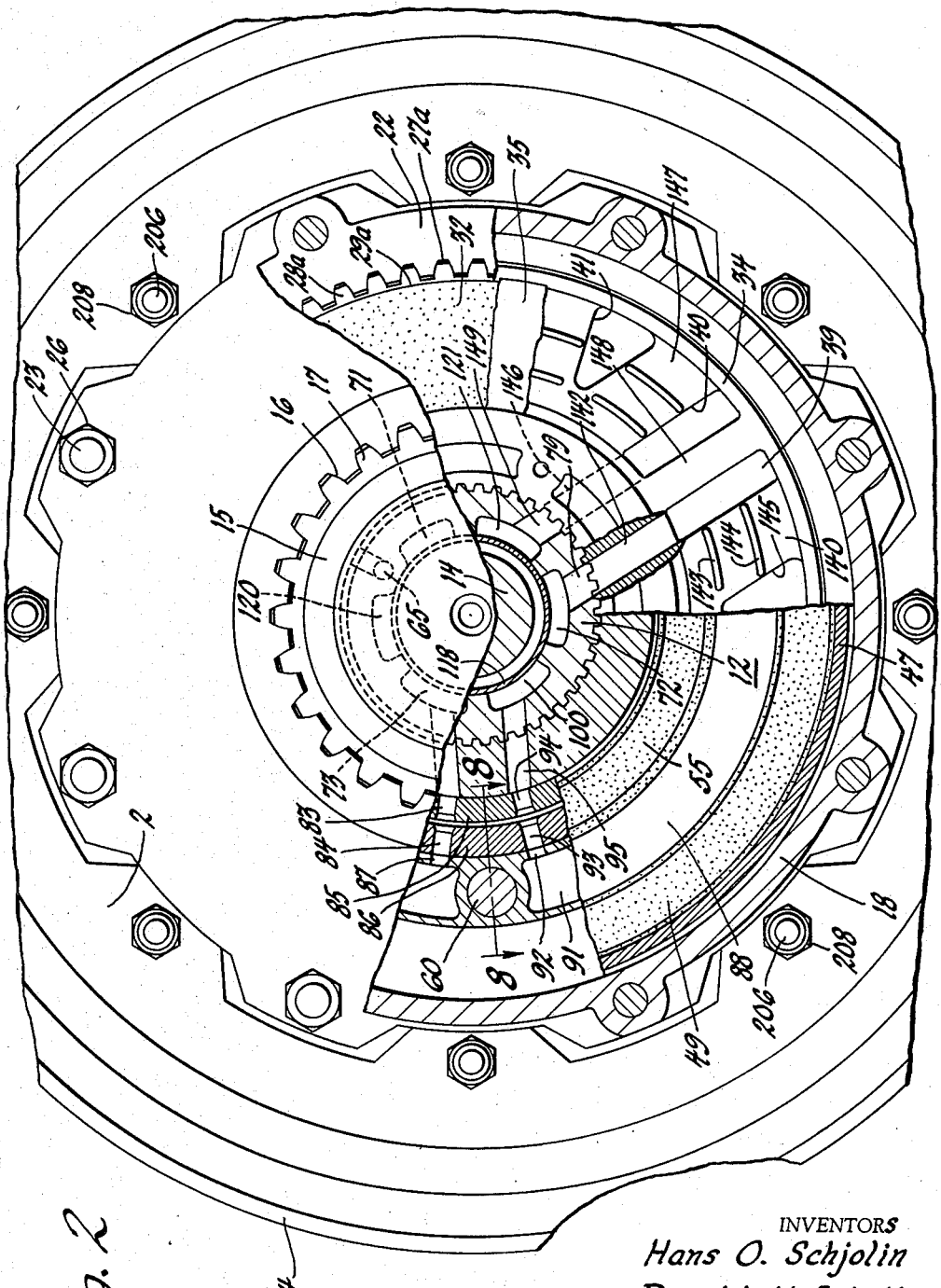

Figure 1 is the general structure of the vehicle disc brake. The housing for the drive shaft including the passage means will subsequently be described in this application. The braking structure described in the following paragraphs is shown in Figure 1 and Figure 2. A vehicle wheel 1 is shown mounted adjacent to the vehicle wheel 2 which form the dual wheels of a truck. A rim 3 is mounted on the outer periphery of wheel 1 and a rim 4 is mounted on the outer periphery of wheel 2. Wheels 1 and 2 are adjoined to the hub 5 by means of a plurality of stud bolts 206 and nuts 207 and 208. The hub 5 is formed integral with the bearing housing 6 which encloses two roller bearing assemblies 7 and 8. Seal assemblies 9 and 10 are provided on the inboard and outboard sides respectively, of the bearing assemblies 7 and 8. The bearing assemblies are held in proper adjustment by the adjustable nut 11. The adjustable nut 11 is provide with a threaded portion on its inner periphery for threadedly engaging the drive shaft housing 12. A seal 13 is placed on the outer periphery of the housing 12 and on the inner periphery of the adjusting nut 11 on its inboard edge.

The drive shaft 14 is rotatably mounted within the shaft housing 12. The drive shaft 14 extends to the outboard side of the brake assembly and is provided with a driving gear portion 15 which is splined on its outer periphery. The spline portion 16 of the drive shaft 14 engages a mating spline portion 17 of the outboard bell shaped brake housing 18.

The bell shaped housing encloses the outboard end of the braking structure and extends inboard over the outer periphery of the braking structure. The hub 5 of the vehicle wheel also is provided with a housing section 19 extending axially outboard and forming the inboard side of the brake housing. These two housing sections 19 and 18 of the brake housing together with a brake housing spacer 20 and two brake disc carriers 21 and 22 form the brake housing. The spacer 20 is mounted between the brake disc carriers 21 and 22 and provides a housing means for the center portion of the braking structure. The bell shaped brake housing 18, the brake housing spacer 20 and the brake disc carriers 21 and 22 are all mounted on the housing section 19 of the wheel hub 5. The fastening means provided for these housing members is the stud bolt 23, nut 24, washer 25 and nut 26. A plurality of these bolts and nuts are angularly spaced about the outer periphery of the braking structure to maintain a housing means.

The housing means described in the above paragraph with the drive shaft 14 and the wheel assembly rotate as a unit when the vehicle wheels 1 and 2 are rotated. The brake disc carriers 21 and 22 have a spline portion 27 and 27a on their inner periphery for engaging a mating spline portion 28 and 28a on the outer periphery of the rotating brake discs 29 and 29a. This provides a supporting means for the rotating discs 29 and 29a and permits axial movement of the brake discs during the brake actuation. Brake disc 29 is provided with a friction material 30 and 31 which is bonded on the parallel sides of the rotating brake disc 29. A similarly bonded friction material 32 and 33 is provided on the parallel sides of the rotating brake disc 29a. The brake discs 29 and 29a being suspended on the inner periphery of the brake disc carriers 21 and 22 respectively and are in constant rotation when the wheels 1 and 2 are in rotation.

An annular coolant plate 34 is centrally mounted between the two rotating brake discs 29 and 29a. The coolant plate 34 is spline connected to the shaft housing 12 on its inner periphery. The coolant plate is also provided with a plurality of passages extending from the shaft housing 12 to a cooling chamber containing baffles in the radially outer portion of the annular coolant plate 34. The coolant plate 34 serves as a mounting means for the backing discs 35 and 36. Backing discs 35 and 36 are bonded to the coolant plate 34 and have a sealing element 37 between the adjoining portions of the backing discs 35 and 36 and the coolant plate 34. Figure 2 more clearly shows the structure of the cooling chamber on the coolant plate 34. The passages 38 extend from the radial inner portion of the coolant plate to the openings 39 on the radial outer portion of the coolant plate 34. The cooling chamber of the coolant plate 34 is provided with holes extended through the plate such as indicated by numbers 40 and 41. The fluid passes circumferentially through the cooling chamber enclosed by the coolant plate 34 and the backing discs 35 and 36. The fluid passes for approximately 120° where it reenters an axial passage in the shaft housing and returns to the inboard side of the shaft housing.

The backing plates 35 and 36 are constructed of a metallic material of a high thermoconductivity such as copper.

The brake structure illustrated employs two fluid pistons operating toward each other. The component parts of the fluid cylinders and fluid pistons are generally symmetrical and are actuated by a pressurized fluid operating through passage means in communication with both pistons simultaneously.

A fluid cylinder 42 is mounted on the inboard side of the braking structure on the outer periphery of the shaft housing 12. Two snap rings 43 and 43a are placed on the inboard side of the wheel cylinder 42. An air passage 44 is provided in the wheel cylinder which adjoins the passage 65 in the shaft housing 12 and the fluid actuating chamber 45 in the wheel cylinder. Actuating fluid seals 46 and 46a are provided on the outer periphery of the shaft housing contacting the inner periphery of the fluid wheel cylinder 42.

The radial outer portion of the fluid cylinder 42 is received within an annular cylinder retainer 47 provided with snap rings 48 and 48a on the inboard side of the wheel cylinder 42 in the inner periphery of the cylinder retainer. The fluid cylinder retainer 47 is concentric with and in spaced relation to the housing section 19 of the wheel hub 5.

The annular wheel cylinder retainer 47 has a radially inwardly extending flange which serves as a mounting means for the diaphragm 49. The diaphragm 49 is a flexible annular disc constructed of a rubber like material. As the components of the brake are assembled, the offset and adjacent portion of the wheel cylinder and wheel cylinder retainer provide a locking means for sealing the outer periphery of the diaphragm 49.

A fluid wheel piston 50 operates in cooperation with a fluid wheel cylinder 42. The fluid piston 50 is generally the same shape as the interior portion of the wheel cylinder 42 although it fits within a diaphragm retainer 51. The diaphragm retainer 51 has a loose fitting tolerance between its adjacent side fitting the inner periphery of the wheel cylinder 42. This loose fit provides for free movement of the wheel piston 50 and the diaphragm retainer 51 relative to the wheel cylinder 42. The diaphragm 49 extends radially inward where it is received between the adjacent and offset portions of the wheel piston 50 of the diaphragm retainer 51 to thereby provide a positive seal. The outboard side of wheel piston 50 has a pressure disc 52 bonded on the outboard side. The pressure disc 52 being bonded to the outboard side of the wheel cylinder 50 provides a closed cooling chamber 53 within the wheel cylinder 50. The pressure disc 52 is constructed of a metallic material having a high thermoconductivity for rapid contact of heat from the engaging surface of the pressure disc to the fluid containing chamber 53. The inboard side of the pressure disc 52 which forms the inner surface of the chamber 53 is provided with a corrugated surface to increase the contact area of the fluid within the chamber and aid in the cooling of the pressure disc 52. The fluid cylinder 50 is provided with inlet and outlet passages similar to that of the central coolant plate 34. The inlet passages are angularly spaced approximately 120° from the outlet passage and are in communication with each other through the chamber 53.

The inlet and outlet cooling passages in the fluid piston 50 are in communication with passages in the diaphragm spacer 54 mounted on the inner periphery of the fluid piston 50. The diaphragms 55 and 56 respectively are mounted on the outboard side and the inboard side of the diaphragm spacer 54. The outboard side of the diaphragm spacer 54 and the adjoining section of the wheel cylinder 50 are provided with an offset portion to provide a positive seal on the radially outer periphery of the diaphragm 55. A similarly formed seal is provided between the inboard side of the diaphragm spacer 54 and the outboard side of the adjoining section of the diaphragm retainer 51. The mating sections of the wheel piston 50 and the diaphragm retainer 51 are offset to form a sealing means on a radially outer periphery of the diaphragm 56. A second diaphragm spacer 57 is mounted radially inward from the diaphragm spacer 54. This diaphragm spacer 57 is provided with inlet and outlet passage means which are in communication with the inlet and outlet passages in the diaphragm spacer 54. The radially inner periphery of the diaphragm 56 is positively sealed between the inboard side of the diaphragm spacer 57 and the outboard side of the fluid wheel cylinder 42 by means of offset portions on the adjoining sections of the members. The diaphragm member 55 is similarly sealed by means of offset portions on the inboard side of the diaphragm spacer 57 and a diaphragm mounting sleeve 58. The diaphragm mounting sleeve 58 is of a predetermined length and held in position by the coolant plate 34 and the diaphragm spacer 57. An additional seal 59 is placed on the inner periphery of the diaphragm mounting sleeve 58 of the outer periphery of the outboard section of the wheel cylinder 42.

It is noted that the assembly of the fluid wheel cylinder 42 and the fluid piston 50 operating in conjunction therewith provides for free axial movement within the actuating chamber 45 of the wheel cylinder 42. The flexibility of the diaphragms 49 and 55 and 56 providing free movement for actuating of the vehicle disc brakes. The diaphragms also provide a passage and seal means for the cooling fluid and a seal means within the actuating chamber of the vehicle disc brake.

The wheel piston is, however, provided with a means for maintaining an alignment between the fluid wheel piston 50 relative to the fluid wheel cylinder 42. This is accomplished by a plurality of pins 60 angularly spaced about the wheel piston.

As previously pointed out the braking structure comprises two wheel cylinders and two fluid wheel pistons which operate toward each other, the operation of the outboard fluid wheel piston relative to the outboard fluid wheel cylinder is the same as that of the inboard piston described in the preceding paragraphs. The air passage 65 is in communication with both fluid actuating chambers 190 and 45 for actuating the fluid pistons simultaneously.

The braking structure is mounted on the outer periphery of the housing 12. The wheel cylinder 42 is spline connected to the outer periphery of housing 12, thereby maintaining a non-rotative position of the wheel cylinder 42 relative to the shaft housing 12. The outboard wheel cylinder 61 is similarly mounted with a spline connection to the shaft housing 12. The coolant plate 34 is also provided with a spline connection to the outer periphery of the shaft housing 12. The braking structure is locked in position by means of a lock ring 62 mounted on the outboard end and the outer periphery of the shaft housing 12. The outboard end of the shaft housing 12 also is provided with a threaded portion for receiving an annular nut 63 which threadedly engages the housing. As the nut 63 is tightened on the outboard end of the housing 12 the lock ring 62 securely locks the brake structure in a fixed and non-rotative position relative to the shaft housing 12.

The passage 44 for actuation of the vehicle disc brakes is shown in Figure 1. The passage extends radially inward in the housing 12 where it adjoins an axially extending passage 65. The axially extending passage 65 continues to where it adjoins the passage means 44 in communication with the actuating chamber 45. A similar passage 67 extends through the outboard wheel cylinder 61 to the actuating chamber 190. The axial passage is also shown in the cross section views of the shaft housing subsequently described in this application.

Figure 3 illustrates the inlet and outlet passage means for the cooling fluid. The inlet passage 70 extends radially inward through the shaft housing 12 where it adjoins axially extending passages 71, 72 and 73. The axially extending passages 71, 72 and 73 are connected by means of the circumferencial passage 122. Passages 71, 72 and 73 are angularly spaced 120° on the inner periphery on the shaft housing 12. The passages extend from the inboard end of the shaft housing 12 to the outboard end of the shaft housing where they are in communication with radially extending passages. Passage 71 is in communication with the radially extending passages 75, 76 and 77. The axially extending passage 72 is in communication with the radially extending passages 78, 79 and 80. The axially extending passage 73 is in communication with the radially extending passages 81 and 82. As the fluid enters the inlet passage 70 it is circulated in such a manner about the inner periphery in passage 122 so that it enters passages 71, 72 and 73. The fluid then moves axially in these three passages until it is adjacent to the radially outward extending passages on the outboard end of the housing 12. The fluid passing through passage 73 enters the passage 81 extending radially outward from the passage 73. Passage 81 is in communication with passage 82 in the wheel cylinder 61 and passage 83 which is a radial passage in the diaphragm spacer 85. Passage 83 is also in communication with the passage 87 which extends radially outward in the diaphragm spacer 86. This passage in turn is in communication with passage 87 and cooling chamber 89 of the fluid wheel piston 88.

The fluid then passes circumferencially within the fluid chamber 89 of the fluid piston 88 for approximately 120°. The fluid then passes radially inward to the axially extending passage in the housing. The fluid cooling chamber 91 is in connection with the entrance of the cooling fluid to the chamber. The chamber 91 shows a similar chamber to that of the cooling chamber 89 together with the exit passage means from the chamber 92. It is noted that the radial passages leading from passage 71 to chamber 189 in Figure 1 are structurally the same but different passages from those described in the previous paragraphs.

The exit passage means includes the passage 92 in the fluid piston 88 which is in communication with the passage 93 of diaphragm spacer 86. This passage 93 and diaphragm spacer 86 in turn is in communication with the passage 94 of diaphragm spacer 85. The fluid then is permitted to pass the return through passage 95 of wheel cylinder 61 and then the axial passage 100. The fluid circuit through is the same in the inboard piston 42 as that of the outboard piston 61.

The fluid cooling circuit through the inboard wheel piston 50 and cooling chamber 53 is the same as that described in the above paragraphs for the coolant chamber 189 of the outboard piston 88. The two wheel pistons are symmetrical and operate to provide a compressing action on the rotating discs and the cooling process in each of these pistons is the same.

A third fluid cooling circuit is provided extending radially from each of the axially extending passages 71, 72 and 73. Figure 2 also illustrates this intermediate cooling circuit through the coolant plate 34 and its cooling chamber 140. The axially extending passage 72 is provided with a radially extending passage 79 adjoining the axially extending passage 72 at a point radially inboard from a coolant block 34. This radially extending passage 79 is in the shaft housing 12 and is also in communication with its radially outer end with the passage 142. Passage 142 is formed within the coolant plate 34. The coolant plate 34 is provided with a cooling chamber 140 which is in communication with passage 142. As the cooling fluid enters the chamber 140 it moves circumferentially about within the cooling chamber for about 120° where it is returned radially inward to the axially extending return passage 100.

The cooling chamber 140 is provided with corrugated ribs 143 and 144 and cross vents 145 to create turbulence within the cooling chamber. The back up discs 35 and 36 which form the walls of the coolant chamber are also provided with corrugated inner walls to provide increased surface area and a greater cooling effect on the back up discs 35 and 36.

A return passage 146 is shown in Figure 2. This return passage 146 is not connected to the cooling chamber 140 but cooling chamber 147, which is separated by the wall 148. The coolant chamber 147 is angularly spaced approximately 120° from the coolant chamber 140. The coolant fluid which is in chamber 147 returns through the return passage 146 in the coolant plate and is in communication with the return passage 149 in the shaft housing 12. The passage 149 in shaft housing 12 is also in communication with the axially extending return passage 121. Return passage 121 is in communication with the outlet passage 123.

Three individual circuits are provided through the three cooling chambers in each of the fluid pistons. The inlet passage means being spaced angularly at approximately 120° from the outlet passage means. The cross section view shown in Figure 4 illustrates the adjoining brake structure adjacent to the brake housing 12. This figure is cut on line 4—4 of Figure 3.

As shown in Figure 3 a seal means is provided on opposite ends of the braking structure. Seals 46 and 46a are provided on the inboard end of wheel cylinder 42 on the outer periphery of the shaft housing 12 for sealing the actuating fluid passage. Seals 112 and 113 are provided on the outer periphery of the lock ring 62 and the inner periphery of the wheel cylinder 61. Additional seals are provided on the inner periphery of the lock ring 62 and the outer periphery of the shaft housing 12 on the outboard end comprising seals 114 and 115. These seals provide means to prevent leakage of the cooling fluid as it enters the radial passage end adjoining the axial passages in the shaft housing 12 and also sealing means for the actuating fluid. The actuating fluid passage means is shown in Figure 1. The fluid pressure passes through the passage 65 and radially outward between the adjoining seals 46 and 46a and also the seals 112 and 113.

The axially extending passages are also sealed on the inboard and outboard end by means of seals 116 and 117, respectively. The radially inner walls of the axial passages are formed by a tube 118 that extends the full length and contacts the inner periphery of the shaft housing 12. Axial grooves are formed on the inner periphery of the shaft housing 12 to form the passages which extend the length of the housing. A return passage means from the brake structure for the cooling fluid includes three axially extending passages 120, 100 and 121. These passages are in communication with the outlet passages 123 and radial return passages in the outboard end of the shaft housing 12. The passages extend inboard to where they adjoin the circumferential passage. Circumferential passage 90 is in communication with the axially extending passages 100, 120 and 121, and also in communication with the outlet passage 123. The inlet passage 70 and the outlet passage 123 are connected to an external fluid cooling circuit such as disclosed in the copending application previously mentioned.

It will be noted that the fluid passage 65 illustrated in Figure 1 is also shown in the various cross-section views of the housing 12. This is the only passage means for transmitting the pressurized actuating fluid from the external circuit to the fluid actuating chambers 190 and 45.

This vehicle brake structure provides for an inlet passage means entering on the inboard side of the wheel and formed within the shaft housing 12. The connections of the external fluid circuit are illustrated in the copending application.

The vehicle brake operates in the following manner: As the manual control means are operated, the pressurized fluid from the supply source is permitted to pass into the passage 64. The pressurized fluid in passage 64 flows into passage 65 into the radially extended passage 44 which is in communication with the brake actuating chamber 45 of wheel cylinder 42 and the passage which is in communication with chamber 190 of wheel cylinder 61. When the chambers contain pressurized air the pistons 50 and 88 move axially relative to the corresponding fluid wheel cylinder. The movement of the wheel pistons relative to the wheel cylinders is an axial movement due to the plurality of alignment pins 60 mounted in the wheel cylinders and extended into the mating fluid pistons. As the pistons move axially, the pressure discs 52 and 130 engage the friction material 31 and 32 respectively. The contact of the pressure discs 52 and 130 with the friction material 31 and 32 move the rotating discs 29 and 29a axially into the point where the friction material 30 and 33 on the opposite side of the rotating plates engage the backing discs 36 and 35 respectively mounted on the coolant plate 34. Continued movement of the actuating fluid pistons creates a frictional engagement of the pressure discs and backing discs with the corresponding friction material on the rotating discs 29 and 29a. This creates a braking effect on the brake housing and the wheel structure.

During the process of the axial movement of the fluid pistons the diaphragm members 49 and 56 operate as a flexible seal for the fluid chamber 45. The pressurized fluid with the chamber 45 is confined and so creates the relative axial movement of the piston to the cylinder. An opposing axial movement is provided on the outboard piston relative to the wheel cylinder to create a compressing action on the brake discs. The diaphragms provide a seal and a freely moving fluid piston relative to the fluid cylinders. This provides a free and easy movement of the vehicle brakes during the actuation.

As the control means for the actuating fluid is released the fluid pressure is relieved in the conduit 64 and 65 and radial conduits extending to the brake actuating chambers 45 and 190. With the pressure relieved in the actuating chambers the fluid pistons 50 and 88 are free to move axially away from the rotating plates 29 and 29a. This axial movement of the wheel pistons relative to the wheel cylinders is accomplished by means of the piston retainer springs 131 and 132. These retainer springs have a wavey contour forming an annular steel band curved to form a spring action for retracting the wheel pistons. The axial curvature of the band is that similar to a simple sinusoidal wave. The action of spring 131 biases pressure disc 52 and fluid pistons 42 away from snap rings 133 to rest on the inwardly extending flange of the retainer ring 47. The opposite piston 88 is retracted in the same manner.

The retraction of the fluid pistons relative to the fluid cylinders provides a clearance between the rotating brake discs 29 and 29a thereby providing free rotation of the vehicle wheels when the brakes are in a released position.

During the actuation of the vehicle brakes, the fluid cooling circuit is in operation. The cooling fluid which is controlled by external control means is permitted to enter the inlet port 70 to where it is distributed to the three axially extending passage means 71, 72 and 73. The fluid moves outboard within these passages to the point where it is adjacent to the radially extending passages leading to the vehicle disc brake. There are three radially extended passages on the outboard end of the shaft housing adjoining each of the axially extending passages 71, 72 and 73. These radial passages extend radially outward as previously described in the specifications to the cooling chambers which are adjacent to the pressure discs and the backing discs. The fluid is circulated approximately 120° contacting the pressure discs and the backing discs and thereby providing the cooling effect on the brake discs. The various baffles which are included in these chambers create a turbulence of the fluid to maintain a better cooling condition for the circulating fluid. The fluid then returns radially inward in passages which adjoin alternate axial extending inlet passages 100, 120 and 121. The passages carry the fluid inboard in shaft housing and expel the fluid in the outlet passage 123. Outlet passage 123 is connected to the external cooling fluid circuit which is described in the co-pending application previously mentioned.

It is noted that the cooling fluid circuit is also positively sealed by means of the flexible diaphragms operating as a seal means within the braking structure. The flexible diaphragms are sealed on their inner and outer periphery and maintain a fluid circuit between the radially inner portion of the wheel cylinders to the cooling chambers in the fluid pistons. The diaphragms in addition to providing a seal means, permit free movement of the fluid pistons relative to the fluid cylinders.

The operation of the cooling fluid circuit external of the braking structure is described in the co-pending application.

While the embodiments of the present invention as herein disclosed, constitute a preferred form, it is to be understood that other forms might be adopted.

What is claimed is as follows:

1. In a fluid cooled vehicle disc brake comprising in combination a shaft housing means, a shaft rotatably mounted within said shaft housing means, said shaft connected to a brake housing means, said brake housing means connected to a wheel rotatably mounted on said shaft housing means, a vehicle disc brake including a plurality of rotor discs connected to said brake housing and rotating with said brake housing means, a plurality of stator discs mounted on said shaft housing for frictionally engaging said rotor discs, a plurality of fluid cylinders mounted on the outer periphery of said shaft housing, a plurality of fluid pistons operating within said fluid cylinders, said fluid pistons provided with fluid cooling chambers formed adjacent to said stator discs in said brake housing, said stator discs formed integral with said fluid pistons forming the pressure discs for actuating said vehicle brakes, said stator discs provided with a fluid cooling chamber for receiving a cooling fluid, said chamber formed integral in said stator discs, said intermediate stator discs operating as backing plates within said vehicle brake structure, said chambers in said fluid pistons and said intermediate stator discs in communication with passage means extending radially inward to said shaft housing, said housing provided with axially extending passage means adapted for circulating a cooling fluid from an external fluid cooling system to said braking means and return from said braking means to said external circuit, thereby providing a cooling circuit for said cooling fluid.

2. A vehicle fluid cooled disc brake comprising in combination a shaft housing means, a wheel rotatably mounted on said shaft housing means, a brake housing means connected to said wheel, a drive shaft connected to said brake housing means, a fluid cooled disc brake including a plurality of rotor brake discs connected to said brake housing means, a plurality of stator discs connected to said shaft housing means, a backing plate intermediate of said rotating brake discs, a plurality of fluid cylinders axially spaced from said rotating brake discs, a plurality of cooperating fluid pistons operating within said fluid cylinders for axially compressing said brake discs, a plurality of diaphragms providing a seal means and permitting relative movement between said fluid cylinder and said fluid pistons, an actuating chamber within said fluid cylinder for actuating said fluid piston with passage means from said fluid cylinder through said shaft housing means and adapted for communication with an external fluid circuit, cooling chambers within said pistons and said intermediate brake disc, inlet and outlet passages for a cooling fluid in communication with said cooling chamber, a plurality of diaphragms providing a seal means in said inlet and said outlet passages, passage means in said shaft housing means providing continuous communication between said cooling chamber, said inlet and outlet passage through said shaft housing and adapted for connection with an external fluid circuit providing circulating means, thereby providing a fluid cooling and fluid actuating vehicle disc brake.

3. A vehicle fluid cooled disc brake comprising in combination, a shaft, a shaft housing means for enclosing said shaft, a shaft housing means for enclosing said shaft, a vehicle wheel rotatably mounted on said shaft housing means, a brake housing means connected to said vehicle wheel and shaft, fluid cooling passage means adapted for connection with an external fluid cooling circuit, said cooling passage means extending axially through said shaft housing means, fluid actuating passage means extending axially through said shaft housing means and adapted for connection with an external fluid actuating circuit, said vehicle disc brake including rotor discs connected to said brake housing means for rotation with said brake housing means, a backing stator disc means spaced between said rotor disc means for frictionally engaging said rotor discs and having cooling chamber means, pressure stator disc means axially spaced from said rotor brake discs for frictionally engaging said rotor discs and having cooling chamber means, said pressure disc means operating as fluid actuating piston means, fluid actuating cylinders mounted on said shaft housing means and operating in conjunction with said pressure disc means for frictionally engaging said rotor brake discs and said stator brake disc means, said fluid actuating cylinders and said pressure disc means forming actuating chambers having seal means provided by diaphragm means, said diaphragm means sealed on their inner periphery and their outer periphery to provide axial movement of said pressure disc means relative to said wheel cylinder means, radially extending passage means connected to said fluid actuating chamber and said axially extending actuating passage means in said shaft housing means and adapted for connection with said external fluid actuating circuit, said fluid cooling chambers in said backing discs and said pressure discs having inlet and outlet passage means in communication with said axially extending fluid cooling passage means in said shaft housing means adapting for connection with said external cooling fluid circuit to provide cooling of said vehicle brakes.

4. A vehicle fluid cooled disc brake comprising in combination, a rotating shaft, a shaft housing means enclosing said shaft, a vehicle wheel rotatably mounted on said shaft housing means, a brake housing means connected to said vehicle wheel and said shaft, fluid actuating passage means adapted for connection with an external fluid actuating circuit and extending through said shaft housing means to a point radially inward of said fluid cooled disc brake, fluid cooling passage means adapted for connection with an external fluid cooling circuit and extending to a point radially inward of said vehicle disc brake, said vehicle disc brake including rotating discs connected to said brake housing means, stator discs connected to said shaft housing means, fluid cylinders connected to said shaft housing means and having fluid actuating chambers and fluid passage means in communication with said fluid actuating passage means radially inward of said vehicle disc brake in said shaft housing means, said fluid actuating chambers formed by fluid pistons and said same fluid cylinders provided with diaphragm means sealed on the radially inner and radially outer portion, said fluid pistons connected to pressure discs for frictionally engaging said rotating brake discs, said fluid pistons and said fluid pressure discs forming cooling chambers, an intermediate brake disc having cooling chambers, said fluid cooling chambers in communication with radial passage means extending to said fluid cooling passage means on the radially inner portion of said vehicle disc brake in said shaft housing means, said radial fluid cooling passage means provided with diaphragm seal means on their axial inboard and outboard sides to provide free movement of said fluid piston relative to said fluid cylinder.

5. A vehicle disc brake comprising in combination, a shaft, a shaft housing means enclosing said shaft, a vehicle wheel rotatably mounted on said shaft housing means, a brake housing means connected to said vehicle wheel and said shaft, fluid actuating passage means in said shaft housing adapted for connection with an external fluid actuating circuit and extending to a point radially inward of said vehicle disc brake, a fluid cooling passage means in said shaft housing adapted for connection with said external cooling fluid circuit and extending to a point radially inward of said vehicle disc brake, said vehicle disc brake including rotating discs connected to said brake housing means, fluid cylinders mounted on said shaft housing means, fluid pistons operating within said fluid cylinders, diaphragm retainers mounted on said fluid pistons, diaphragm means mounted on the outer periphery of said fluid pistons and sealed on its inner periphery by said fluid pistons and said diaphragm retainers, the outer periphery of said diaphragm sealed on its outer periphery by said fluid cylinders and fluid cylinder retainers, the inner periphery of said fluid pistons and said diaphragm retainers engaging and sealing a second diaphragm means on its outer periphery, a diaphragm spacer mounted on the said wheel cylinder radially inward from said fluid piston, said diaphragm spacer and said fluid cylinder providing a sealing means on the inner periphery on second mentioned diaphragm means, said fluid piston and said fluid cylinder thereby providing an actuating chamber being in communication with a passage means extending radially inward to said fluid actuating passage means in said shaft housing means, thereby providing a fluid actuating means for actuation of said vehicle brakes, said fluid pistons bonded to stator discs for frictionally engaging said rotor discs, an intermediate disc spaced between said rotor discs for frictionally engaging the opposite side of said rotating discs from said wheel cylinders, said intermediate discs provided with cooling chamber means, said fluid piston provided with fluid cooling chamber means and having radially extending passages in communication with said fluid cooling chamber means in said intermediate stator discs and said fluid pistons to provide a fluid cooling means in communication with said fluid cooling chambers and said fluid cooling passage means in said shaft housing means adapted for connection with an external fluid cooling circuit.

6. A vehicle fluid cooled disc brake comprising in combination, a shaft, a shaft housing means enclosing said shaft, a vehicle wheel rotatably mounted on said shaft housing means, a brake housing means connecting said wheel and said shaft, fluid actuating passage means adapted for connection with an external fluid actuating circuit and extending through said shaft housing means to a point adjacent to said vehicle disc brake, fluid cooling passage means adapted for connection with an external fluid cooling circuit and extending through said shaft housing means to a point adjacent to said vehicle disc brake, said vehicle disc brake including rotor discs connected to said brake housing, stator discs connected to said shaft housing means, said stator discs provided with cooling chambers, a plurality of said stator discs connected to a fluid brake actuating means, said fluid actuated means having a fluid actuating chamber sealed by diaphragm means, said fluid actuating means in communication with said fluid actuating passage means in said shaft housing means, said fluid cooling chambers in said stator discs having interconnecting passage means in communication with said fluid cooling passage means in said shaft housing means, said interconnecting passage means provided with a diaphragm means, said sealing diaphragm means thereby providing free axial movement of said fluid actuating means for actuating said fluid disc brake.

7. A vehicle fluid cooled disc brake means comprising in combination, a vehicle drive shaft, a brake housing means connected to said vehicle drive shaft, a shaft housing means enclosing said vehicle drive shaft, a vehicle wheel rotatably mounted on said shaft housing means and connected to said brake housing means, fluid actuating passage means in said shaft housing means adapted for connection with a fluid actuating circuit and extending through said shaft housing means to a point adjacent to the vehicle disc brake, fluid cooling passage means in said shaft housing means adapted for communication with an external fluid cooling circuit and extending to a point adjacent to said vehicle disc brake, a vehicle disc brake including rotor discs connected to said brake housing means, stator connected to said shaft housing means, an intermediate stator disc spaced between said rotor discs, stator discs axially spaced from said rotor discs at a point opposite of said intermediate disc relative to said rotor discs, fluid actuating means for axially compressing said stator discs and frictionally engaging said rotor discs, said actuating means including a fluid actuating chamber having diaphragm sealing means, said diaphragm sealing means provided on the inner periphery and outer periphery of said fluid actuating chamber to form a fluid tight chamber and a means for axially compressing said rotor and said stator discs to frictionally engage each other when said vehicle brakes are actuated, said diaphragm means thereby providing a freely moving actuating means and fluid tight actuating chamber, said stator discs provided with cooling chambers, said cooling chambers having interconnecting passage means extending to said passage means of said shaft housing means thereby providing a cooling means within said vehicle brake discs adapted for communication with said external fluid cooling circuit.

8. A vehicle cooled disc brake comprising in combination, a vehicle drive shaft, a drive shaft housing enclosing said vehicle drive shaft, a vehicle wheel rotatably mounted on said vehicle shaft housing, a brake housing means adapted for connection with vehicle wheel and said vehicle drive shaft, fluid actuating passage means connected to said external circuit and extending through said shaft housing means to a point adjacent to said vehicle disc brakes, fluid cooling passage means adapted for communication with an external fluid cooling system and extending through said shaft housing means to a point adjacent to said vehicle disc brake, said vehicle disc brake including rotor discs mounted on said brake housing means, an intermediate stator disc placed between said rotor discs and mounted on said shaft housing means, stator discs axially spaced from said rotor discs and opposite of said intermediate discs, said second mentioned stator discs forming inboard and outboard stator discs formed integral with fluid pistons, said fluid pistons mounted within fluid cylinders and operating in cooperation with said fluid cylinders, said fluid cylinders mounted within cylinder retainer means on their outer periphery and mounted on said shaft housing means on their inner periphery, a diaphragm retainer spaced between said fluid piston and said fluid cylinder for forming a seal on a radially inner and radially outer diaphragm, said seal on said diaphragm means formed on the inner periphery of the radially outer diaphragm and the radially outer periphery of the radially inner diaphragm, the radially outer portion of said radially outer diaphragm forming a seal means where it is mounted between said wheel cylinder retainer and said wheel cylinder, a diaphragm spacer concentric and radially inward of said fluid piston and forming a seal means with said diaphragm retainer, a second diaphragm spacer concentric with said fluid piston and mounted radially inward forming a second seal means with said inner diaphragm and said wheel cylinder, said radially inward and radially outward diaphragm thereby forming a seal means for a confined fluid actuating chamber, said fluid actuating chamber in communication with intercommunicating passage means extending to said fluid actuating passage means in said shaft housing means, a second diaphragm mounted concentric with said fluid piston and forming a seal between the radially outer diaphragm spacer and the radially inner portion of said fluid piston, said second mentioned diaphragm spacer mounted radially inward of said first mentioned diaphragm spacer providing a seal with said radially inner portion of said third mentioned diaphragm, a cooling chamber within said fluid piston in communication with interconnecting passage means, adjoining fluid cooling passages in said shaft housing means thereby providing a fluid cooling means through said vehicle disc brake adapted for connection with said external fluid cooling circuit.

References Cited in the file of this patent

UNITED STATES PATENTS

| | | |
|---|---|---|
| 2,082,277 | Dierfeld | June 1, 1937 |
| 2,148,818 | Kattwinkel | Feb. 28, 1939 |
| 2,821,271 | Sanford | Jan. 28, 1958 |
| 2,821,273 | Sanford et al. | Jan. 28, 1958 |